Sept. 2, 1924.   C. C. RICH   1,506,944
BATTERY PLATE
Filed Sept. 13, 1922   2 Sheets-Sheet 1
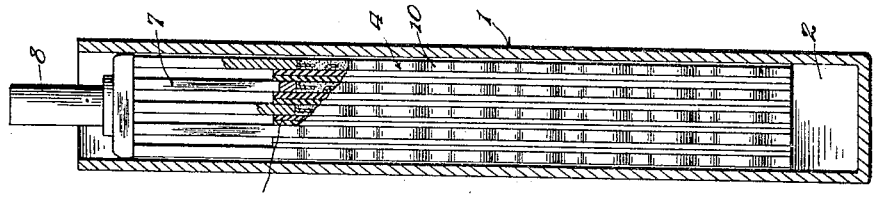
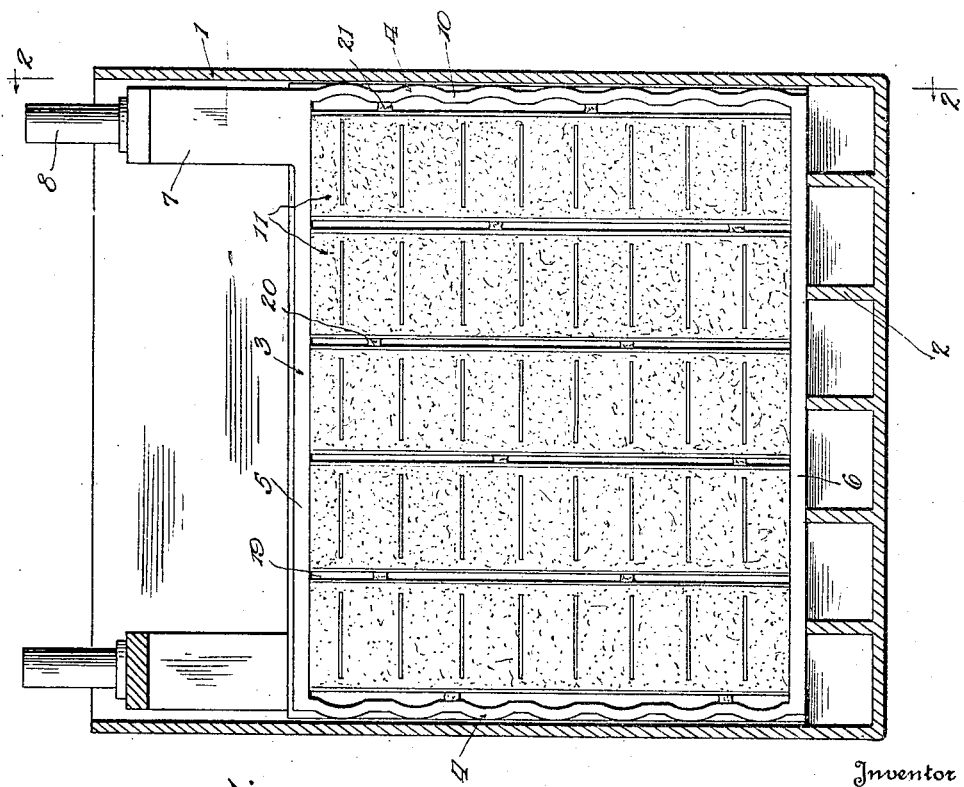
Inventor
C. C. Rich.
By Lacy & Lacy, Attorneys

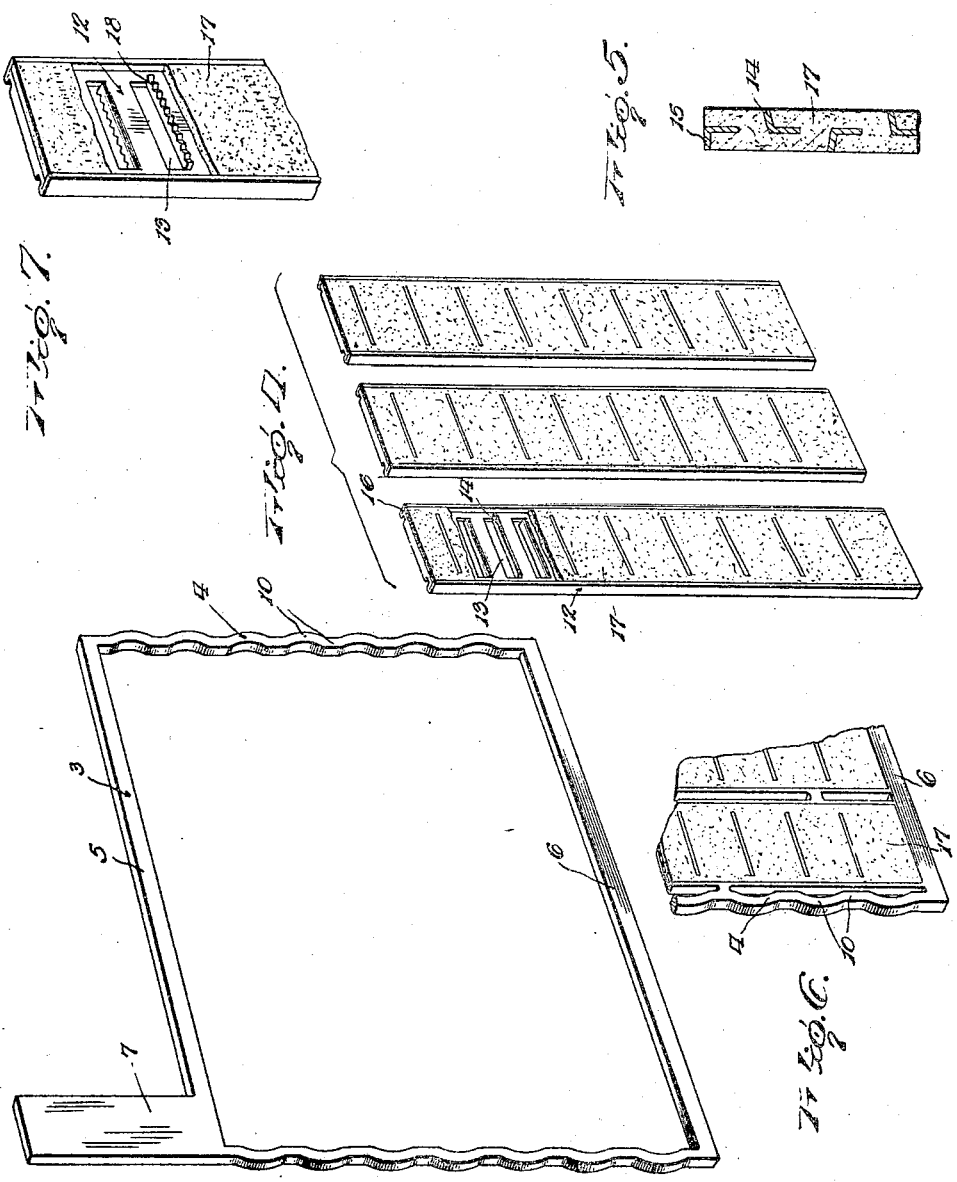

Patented Sept. 2, 1924.

1,506,944

UNITED STATES PATENT OFFICE.

CHARLES CLAYTON RICH, OF MOUNT VERNON, NEW YORK, ASSIGNOR OF ONE-TWENTIETH TO CHARLES WINTERMEYER, OF MOUNT VERNON, NEW YORK.

BATTERY PLATE.

Application filed September 13, 1922. Serial No. 588,009.

*To all whom it may concern:*

Be it known that I, CHARLES CLAYTON RICH, a citizen of the United States, residing at Mount Vernon, in the county of Westchester and State of New York, have invented certain new and useful Improvements in Battery Plates, of which the following is a specification.

This invention relates to improvements in storage battery plates. The standard type of storage battery embodies grids in the nature of rigid rectangular frames in which is compressed a filling of the active material. Under conditions of use, the filling will contract while the battery is under charge, and will expand when the battery is being discharged. It is a well-known fact that when the battery has been discharged below the safety limit the expansion of the active material takes place to an even greater degree, with the result that the plates become buckled or dished so that the corners thereof are liable to penetrate the porous separators thus bringing into contact plates of opposite polarity and causing an internal short circuiting of the battery. This buckling of the plates is due partly to the fact that their frames are relatively rigid and cannot therefore yield to compensate for the expansion and contraction of the filling of active material, and partly to the fact that, the grids being of considerable area, the expansive force is cumulative as it acts in the direction of the margins of the frames. Therefore, it is the primary object of the present invention to provide a storage battery plate of such construction as to practically positively preclude any buckling or distortion which would result in internal short circuiting of the battery. More specifically, the invention contemplates the provision of a battery plate so constructed as to possess a certain degree of flexibility thus compensating for the expansive and contractive forces created in the discharging and charging of the battery.

Briefly stated, the battery plate embodying the invention comprises a frame, and a plurality of grid elements located therein, and the invention contemplates so forming the sides of the frame as to provide for expansion and contraction thereof without fracture or distortion of the frame under conditions of use. In this connection the invention also contemplates the provision of means permitting sufficient relative movement of the grid elements to compensate for their individual expansion and contraction.

Another important object of the invention is to provide for a maximum surface area of active material in a minimum space so that the battery as a whole will be very compact.

The invention also resides in the construction of the grid elements which is such as to permit of them being produced with facility and at a low cost, the construction being furthermore of such a nature as to insure of durability of the elements both as regards liability to distortion and to shedding of the active material.

Another object of the invention is to so construct the grid elements that a maximum surface area of the active material will be presented and the material at the same time will be anchored in a most secure manner.

In the accompanying drawings:

Figure 1 is a side elevation of one of the battery plates embodying the invention installed in a battery cell;

Fig. 2 is a vertical transverse sectional view on the line 2—2 of Fig. 1;

Fig. 3 is a perspective view of the frame of one of the plates;

Fig. 4 is a perspective view of several of the grid elements before assemblage in the frame, a portion of the filling of active material of one of said elements being removed to better illustrate the construction of the foundation of the element;

Fig. 5 is a detail vertical sectional view through a portion of one of the grid elements;

Fig. 6 is a perspective view illustrating a slightly modified form of plate;

Fig. 7 is a perspective view illustrating a slightly modified form of grid element.

In the drawings, the battery jar is indicated in general by the numeral 1 and the same is formed of glass or of any of the other materials customarily employed for this purpose, and is provided in its bottom with partitions 2 which are designed to support the plates embodying the invention. Each of the plates comprises a frame which is indicated in general by the numeral 3 and which comprises sides 4, a top 5, and a bottom 6, the frame being of the rectangular form illustrated and being made of lead or any other suitable metal. At one upper corner the frame is provided with an extension 7 electrically connected with a binding post 8, it being understood that the positive and negative plates are to be arranged in precisely the same manner as in any ordinary storage battery and separated by separator plates interposed between them. In order to provide for expansion and contraction of the frame in a vertical direction, the sides 4 of the frame, instead of being formed straight as is usual, are given a sinusoidal form or, in other words, are formed with a series of alternately oppositely directed bends 10. At this point it will be evident that by forming the side members of the frame with the bends 10, these members are permitted to become more or less elongated upon expansion of the grid elements within the frame in a general vertical direction. It will be understood, of course, that the bends 10 may be more or less pronounced or more or less gradual as may be found expedient and likewise they may be formed in an uninterrupted or an interrupted series. Also the number of bends in a given size of frame will be determined by the judgment of the manufacturer.

Within each of the frames there is formed or arranged a series of grid elements indicated in general by the numeral 11. Each of the grid elements comprises a foundation indicated in general by the numeral 12 and formed from a plate preferably of lead which is acted upon by a stamping machine or in any other approved manner to form a plurality of transverse openings 13 arranged one above another throughout the height of the plate. The material which is stamped out from the plate in forming these openings 13 provides supporting flanges or ledges indicated by the numeral 14, and these ledges are located at the lower sides of the openings and are inclined upwardly at a slight angle to the horizontal, as best shown in Figs. 4 and 5 of the drawings. By reference to Figs. 4 and 5 it will also be observed that the ledges 14 are alternately located at opposite faces of the plate. The upper and lower ends of the plate are overturned to project from the plane of the plate as indicated by the numeral 15 so as to provide upper and lower retaining flanges for the active material. The lateral portions of each plate are bent or folded to form flanges 16 which project beyond opposite faces of the plate. The numeral 17 indicates a filling of an electro-active material which is applied in paste form to the opposite faces of the plate and this filling, upon hardening, will be retained in place by the ledges 14 and flanges 15. By slightly upwardly inclining the ledges 14 the material is not only afforded substantial support but likewise it is restrained from dropping out of place. It will be observed that a portion of the filling enters the openings 13 and that the said filling is presented at both faces of the element, the entire area of each face of the element being active except for the negligible portions occupied by the edges of the ledges 14. In the form of the invention shown in Figs. 4 and 5 of the drawings, the edges of the ledges 14 are of right line extent, or in other words, unbroken, but if it should be found advisable to present active material at the portions of the areas of the faces of the elements which would be occupied by the said edges of the ledges, these edges may be serrated as clearly shown in Fig. 7 of the drawings and as indicated by the numeral 18.

In building up the plate, the proper number of the grid elements are assembled within the frame 3 in position occupying a common plane within the boundary of the frame and with their edges presented toward one another but slightly spaced as indicated by the numeral 19. Likewise the outwardly presented edges of the endmost elements of the set are slightly spaced from the adjacent side members 4 of the frame. However, it is desirable to bond the elements to one another and to the sides of the frame, and with this purpose in view the opposing edges of adjacent ones of the elements are bonded as indicated by the numeral 20, at spaced points and likewise the said outwardly presented edges of the endmost elements of the set are bonded as at 21 to the side members 4 of the frame. It will be observed by reference to Fig. 1 of the drawings that the bonds 20 and 21 are staggered throughout the set of grid elements so that no two of the bonds, between adjacent plates, will be in alinement transversely of the battery plate as a whole. Therefore, when expansion takes place, the grid elements may expand in the direction of their transverse dimensions without any likelihood, however, of causing distortion and without the expansion becoming cumulative and being ultimately imposed upon the sides of the plate frame. In that form of the invention shown in Figs. 1 to 5, inclusive, the grid elements are initially formed separate from the frame and are then assembled within the frame and bonded in place, but if desired the plate may be formed integral throughout as illustrated in Fig. 6 of the drawings. That is to say, the upper and lower ends of the foundation plates of said elements will in this case be integral with the upper and lower members 5 and 6 of the frame, and the bonds between the elements may constitute an integral part therewith.

From the foregoing description of the invention it will be evident that ample provision is made for expansion of the active material so that it is unlikely that there will be any buckling of the grid elements individually or of the plates as a whole. Also it will be evident that because of the peculiar arrangement of the grid elements within the frame of the plate there can be practically no cumulative expansive force created which would tend to distort the frame or the plate as a whole. Also it will be evident that by spacing the relatively adjacent edges of the grid elements, provision is made for greater freedom of circulation of the electrolyte.

It will be evident that the particular grid elements disclosed herein might, so far as their structure is concerned, be employed within a frame having straight instead of sinusoidal sides.

While the component parts of the plate are above described as produced by a process of stamping, it is evident that they might be produced by casting or otherwise.

Having thus described the invention, what is claimed as new is:

1. A storage battery plate comprising a frame having upper and lower members and side members, the side members being longitudinally expansible and each being of substantially uniform cross sectional dimensions throughout its length, and a plurality of electro-active elements supported within the frame and extending between the upper and lower members thereof and likewise between the said longitudinally expansible side members, the said elements being relatively spaced and bonded at intervals between their opposing portions.

2. A storage battery plate comprising an expansible frame, and a plurality of electro-active elements supported within the frame, the said elements being disposed edgewise with relation to each other with their relatively adjacent edges spaced except at relatively remote intervals at which points the said edges of the elements are bonded together.

3. A storage battery plate comprising a frame, and a plurality of electro-active elements supported within the frame, the said elements being disposed edgewise with relation to each other with their relatively adjacent edges spaced except at relatively remote intervals at which points the said edges of the elements are bonded together, the said bonds being located in staggered relation throughout the series of elements.

4. A storage battery plate comprising an expansible frame, and a plurality of electro-active elements supported within the frame, the said elements being disposed edgewise with relation to each other with their relatively adjacent edges spaced except at relatively remote intervals at which points the said edges of the elements are bonded together, the said bonds being located in staggered relation throughout the series of elements, and the endmost elements of the series being likewise bonded at intervals to the side members of the frame.

5. A storage battery plate comprising a frame having side members each formed throughout its entire length with a continuous series of back and forth bends all occupying a common plane and providing for longitudinal expansion of each side member, and an electro-active element supported within the frame and extending between the other side members thereof.

6. A storage battery plate comprising a frame having side members of sinusoidal form and each of substantially uniform cross sectional dimensions throughout its length, and an electro-active element supported within the frame between the other sides thereof, the said element extending substantially parallel to the general line of extent of the first-mentioned side members.

7. A storage battery plate comprising a frame having upper and lower members and side members of sinusoidal form to provide for longitudinal expansion, and a plurality of electro-active elements supported within the frame and extending between the upper and lower members thereof and substantially parallel to the general line of extent of the said side members, the said electro-active elements being mutually bonded to each other at spaced points and likewise bonded to the said side members of the frame.

8. A storage battery plate comprising a frame having upper and lower members, and side members of sinusoidal form to provide for longitudinal expansion, and a plurality of electro-active elements supported within the frame and extending between the upper and lower members thereof and substantially parallel to the general line of extent of the said side members, the said electro-active elements being mutually bonded to each other at spaced points and likewise bonded to the said side members of the frame, the bonds being located in staggered relation.

9. A storage battery grid element comprising a metallic plate provided with transverse openings and with portions stamped out to form the openings and providing ledges projecting alternately from opposite faces of the plate and adapted to support and anchor a filling of an electro-active material, the edges of the ledges being serrated.

In testimony whereof I affix my signature.

CHARLES CLAYTON RICH. [L. S.]